(12) United States Patent
Bosch et al.

(10) Patent No.: US 11,425,098 B2
(45) Date of Patent: Aug. 23, 2022

(54) STREAMLINED AUTHENTICATION AND AUTHORIZATION FOR VIRTUAL PRIVATE NETWORK TUNNEL ESTABLISHMENT

(71) Applicant: Cisco Technology, Inc., San Jose, CA (US)

(72) Inventors: Hendrikus G. P. Bosch, Aalsmeer (NL); Alessandro Duminuco, Milan (IT); Sape Jurriën Mullender, Amsterdam (NL); Jeffrey Michael Napper, Delft (NL)

(73) Assignee: Cisco Technology, Inc., San Jose, CA (US)

(*) Notice: Subject to any disclaimer, the term of this patent is extended or adjusted under 35 U.S.C. 154(b) by 241 days.

(21) Appl. No.: 16/855,809

(22) Filed: Apr. 22, 2020

(65) Prior Publication Data

US 2021/0273913 A1 Sep. 2, 2021

Related U.S. Application Data

(60) Provisional application No. 62/983,210, filed on Feb. 28, 2020.

(51) Int. Cl.
*H04L 9/40* (2022.01)
*H04L 12/46* (2006.01)

(52) U.S. Cl.
CPC ...... *H04L 63/0272* (2013.01); *H04L 12/4633* (2013.01); *H04L 63/0435* (2013.01); *H04L 63/0815* (2013.01); *H04L 63/101* (2013.01); *H04L 63/20* (2013.01)

(58) Field of Classification Search
CPC ............ H04L 63/0272; H04L 63/0435; H04L 63/0815; H04L 63/101; H04L 63/20
USPC .......................................................... 726/15
See application file for complete search history.

(56) References Cited

U.S. PATENT DOCUMENTS

| | | | | |
|---|---|---|---|---|
| 9,948,612 | B1* | 4/2018 | Jawahar | H04L 63/0263 |
| 2016/0218978 | A1* | 7/2016 | Lapidous | H04L 61/6009 |
| 2018/0115547 | A1* | 4/2018 | Peterson | H04L 63/029 |
| 2020/0162431 | A1* | 5/2020 | Goldschlag | H04L 9/3218 |
| 2020/0304459 | A1* | 9/2020 | Konda, Jr. | H04L 12/4633 |

(Continued)

OTHER PUBLICATIONS

Thanh et al., 2013 IEEE ICOIN, "Implementation of Open Two-Factor Authentication Service applied to Virtual Private Network", pp. 135-140 (Year: 2013).*

(Continued)

*Primary Examiner* — Khalil Naghdali
(74) *Attorney, Agent, or Firm* — Lee & Hayes, P.C.

(57) ABSTRACT

An identity provider (IdP) service interoperates with a Virtual Private Network (VPN) client. The IdP service receives a login request originating from the VPN client to establish a VPN tunnel between the VPN client and a VPN host, the login request indicating a user of the VPN client. The IdP service provides a response to the login request. The response includes at least both first information including an indication that the user of the VPN client is an authorized user and second information including an indication of a VPN policy for the VPN tunnel, the VPN policy including a VPN client policy to be utilized during the VPN tunnel by the VPN client and a VPN host policy to be utilized during the VPN tunnel by the VPN host.

17 Claims, 7 Drawing Sheets

(56) References Cited

U.S. PATENT DOCUMENTS

2021/0160219 A1* 5/2021 Goldschlag ......... H04L 67/2814

OTHER PUBLICATIONS

Malinowski et al., 2014 IEEE, Proceedings of the 2014 Federated Conference on Computer Science and Information Systems, "The procedure for monitoring and maintaining a network of distributed resources", pp. 947-954 (Year: 2014).*

* cited by examiner

STREAMLINED AUTHENTICATION AND AUTHORIZATION FOR VIRTUAL PRIVATE NETWORK TUNNEL ESTABLISHMENT

PRIORITY CLAIM

This application claims the benefit of U.S. provisional patent application 62/983,210, filed Feb. 28, 2020, the disclosure of which is incorporated by reference herein in its entirety.

TECHNICAL FIELD

The present disclosure relates generally to authentication and authorization for Virtual Private Network (VPN) tunnel establishment and, more specifically, to a streamlined method of establishing a VPN tunnel.

BACKGROUND

A virtual private network (VPN) provides a private network, virtually, over a public network such as the Internet. Client devices can send and receive data across the public network as if the client devices are directly connected to other devices and services via the private network. Thus, the client devices can communicate securely, via a VPN tunnel, across the public network.

For example, the client devices may be devices of remote users, such as devices of employees who telecommute. The VPN provides the remote users secure access to corporate applications and other corporate resources. A private network tunnel is established using an encrypted layered tunneling protocol between a VPN client executing on a client devices and a VPN host executing on a server. The VPN client uses authentication methods, including passwords or certificates, to obtain access to the VPN. In some examples, the VPN client and VPN host also operate according to particular VPN policies associated with characteristics of the user of the VPN client.

Services such as provided by a Remote Authentication Dial-In User Service (RADIUS) service, a Lightweight Directory Access Protocol (LDAP) service, an Active Directory (AD) service and/or a Diameter service are authentication and authorization (auth & auth) services that may be used to handle authentication of enterprise users and to relay authorization indications to enterprise network-attachment points. For example, when an on-premise enterprise user connects to a campus enterprise network, back-end switches and routers may engage with auth & auth services before a tunnel is established and enterprise users are granted access to the enterprise network. These services may additionally indicate to those back-end switches and routers what specific access is allowed. Similarly, auth & auth services are utilized when remote-access enterprise users access an enterprise network using a VPN client. Similar to the on-premise situation, back-end switches and routers may engage with the auth & auth services to authenticate the remote-access enterprise user and to obtain authorization for the user. In other words, these services allow a VPN host to determine what enterprise network resources the remote-access enterprise user is authorized to access.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
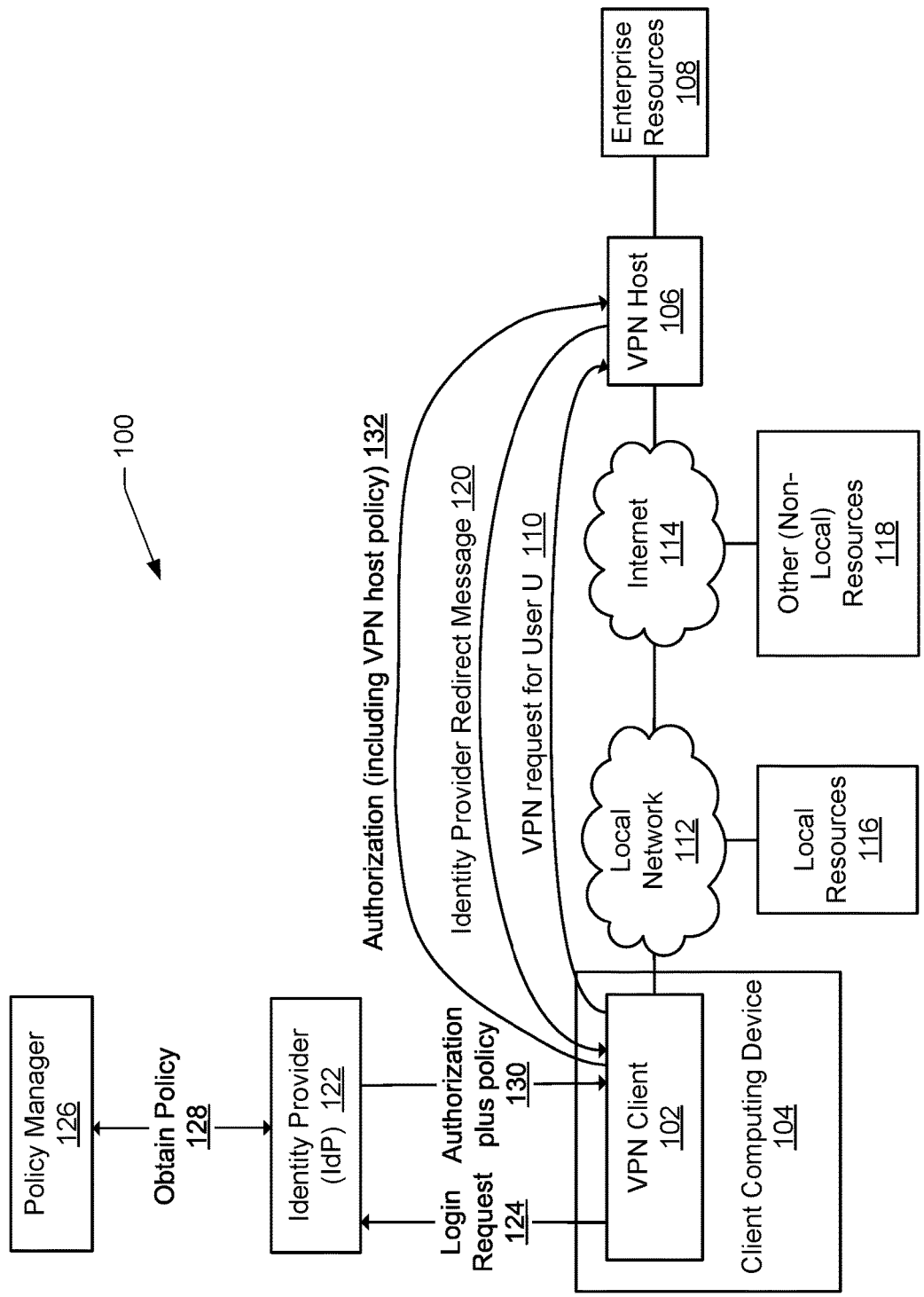
FIG. 1 is a diagram illustrating an example system in which a VPN client executing on a client computing device establishes a VPN tunnel with a VPN host, with the VPN client receiving a VPN host policy and a VPN client policy, and the VPN client providing the VPN host policy to the VPN host.

This disclosure describes a method for an identity provider service (IdP) to interoperate with a Virtual Private Network client. The IdP service receives a login request originating from the VPN client to establish a VPN tunnel between the VPN client and a VPN host, the login request indicating a user of the VPN client. The IdP service provides a response to the login request. The response includes at least both first information including an indication that the user of the VPN client is an authorized user and second information including an indication of a VPN policy for the VPN tunnel, the VPN policy including a VPN client policy to be utilized during the VPN tunnel by the VPN client and a VPN host policy to be utilized during the VPN tunnel by the VPN host.

The disclosure further describes a method for a VPN client to form a VPN tunnel with a VPN host. The VPN client originates a login request to establish the VPN tunnel between the VPN client and the VPN host. The login request indicates a user of the VPN client. The VPN client receives a response to the login request. The response includes at least both first information including an indication that the user of the VPN client is an authorized user and second information including an indication of a VPN policy for the VPN tunnel. The VPN policy includes a VPN client policy to be utilized during the VPN tunnel by the VPN client and a VPN host policy to be utilized during the VPN tunnel by the VPN host. The VPN client provides at least an indication of the VPN host policy to the VPN host.

The disclosure further describes a method for a VPN host to form a VPN tunnel with a VPN client. The VPN host receives, originating from the VPN client, first information including at least an indication of a VPN host policy to be utilized during the VPN tunnel by a VPN host. The VPN host establishes the VPN tunnel with the VPN client, including processing the VPN host policy.

Additionally, the techniques described herein may be performed by a system and/or device having non-transitory computer-readable media storing computer-executable instructions that, when executed by one or more processors, performs the methods described herein.

Example Embodiments

Virtual private networks ("VPNs") allow secure communication between two or more devices over a public or otherwise non-trusted network. In a typical VPN arrangement, a user is associated with an endpoint device, such as a workstation, personal computer, or mobile phone, that executes VPN client software. The endpoint device establishes a tunnel through a non-trusted network, such as the public Internet, to a gateway or other network node (VPN host), that executes VPN server software and is associated with a secure network of a business enterprise or other entity. The endpoint and network node negotiate encryption keys, creating an encrypted tunnel connection through the non-trusted network. The endpoint and VPN host then communicate encrypted information over the non-trusted network using the encrypted tunnel connection, and the encrypted information is decrypted at the endpoints.

Establishing the VPN tunnel employs messaging between a VPN client executing by the endpoint device and the VPN host. Besides negotiating encryption keys between the VPN client and the VPN host, establishing the VPN tunnel involves messaging with other entities as well. For example, authentication of the user may be carried out by an IdP services provider such as a single sign-on (SSO) service. Data may be provided to and from the IdP, during the establishment of the VPN tunnel, via various messages.

Furthermore, VPN tunnels operate according to policies on both the VPN host side and the VPN client side. For example, the VPN host may regulate access by a user to network resources depending on an access class to which the user belongs. For example, a user in a network administrator access class may have full access to network resources via a VPN tunnel. On the other hand, employees in various departments may have access via a VPN tunnel only to network resources that are relevant to each respective department. As another example, a contractor may only have access via a VPN tunnel to resources that are segregated from other network resources, such as to a special server designated to be used by contractors.

On the VPN client side, for example, there may be one or more policies to govern split tunneling. Split tunneling allows a remote user to concurrently access different security domains. For example, a remote-access enterprise user may be connected to an enterprise network using a VPN tunnel via a VPN client, but may also need to access a public network like the Internet and/or resources of a local area network (LAN), such as a LAN-connected printer. In this way, the remote-access enterprise user may be allowed to access resources of the enterprise network (such as file servers and mail servers), with the security of this access being controlled by the enterprise. On the other hand, with the split tunneling, access to the other resources such as the Internet or LAN-connected printer may not be controlled by the enterprise.

The split-tunneling may be controlled by the VPN client. For example, the split-tunneling configuration of the VPN client may be set according to a split-tunneling policy set by the enterprise. For example, the split-tunneling policy for the remote-access enterprise user may be controlled by a policy manager of the enterprise. The split-tunneling policy may be provided to the VPN client as part of a process to establish the VPN tunnel between the VPN client and a VPN host of the enterprise. The VPN client may set the split-tunneling configuration according to the split-tunneling policy provided to the VPN client.

The VPN policies may be user-specific. The user-specific policies may be controlled using a policy manager such as a directory service. Data may be provided to and from the policy manager, during the establishment of the VPN tunnel, via various messages.

In some examples, the remote-access enterprise user, via a VPN client, may request a tunnel to a VPN host. This may include, for example, the VPN client providing a tunnel request to the VPN host. The VPN client may interact with an IdP to cause the IdP to obtain an authorization for the remote-access enterprise user to connect to the VPN host in a VPN tunnel. For example, the IdP may obtain the authorization, for the remote-access enterprise user to connect to the VPN host, from a policy manager such as is included in a RADIUS service, an LDAP service, an AD service and/or a Diameter service.

The IdP may then provide an authorization message to the VPN client. The VPN client may utilize data in the authorization message it receives from the IdP to provide authorization to the VPN host. In this way, the remote-access enterprise user may receive authorization to establish, using a VPN client, a VPN connection to a VPN host. Furthermore, the VPN client may then provide an indication of the authorization to the VPN host, and the VPN client and the VPN host may interoperate to establish the VPN tunnel.

As part of processing by the VPN host to establish the VPN tunnel with the VPN client, the VPN host may interact with the policy manager to determine a policy according to which the VPN tunnel is to operate, as set by the enterprise. The VPN host may thereafter configure itself for the tunnel with the remote-access enterprise user according to the VPN policy, using a host portion of the VPN policy. The VPN host may also provide a client portion of the VPN policy to the VPN client, for the VPN client to configure itself according to the VPN policy, using the client portion of the VPN policy. The client portion of the VPN policy may include, for example, a split-tunneling policy such that the remote-access enterprise user is allowed to access other resources, where the security of the access to the other resources is not being controlled by the enterprise.

It can be seen that the signaling/messaging involved in establishing a VPN tunnel may be complicated. As discussed herein, the signaling may be simplified by incorporating the VPN policy in a message to the VPN client along with the VPN authorization, such as by the IdP. The VPN client may retain a client portion of the VPN policy. The VPN client may provide a host portion of the VPN policy to the VPN host along with an indication of the authorization the VPN client received.

The techniques described herein may be performed by a system and/or device having non-transitory computer-readable media storing computer-executable instructions that, when executed by one or more processors, performs the methods described herein.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 is a diagram illustrating an example system 100 in which a VPN client 102 executing on a client computing device 104 establishes a VPN tunnel with a VPN host 106. Using the VPN tunnel, the client computing device 104 may securely communicate with or otherwise access or utilize enterprise resources 108. For example, a user of the client computer device 104 may securely access the enterprise resources as if the user was directly plugged in to the network's servers.

The client computing device 104 may be, for example, a portable or desktop personal computer, mobile computing device such as a tablet or mobile telephone, or a device having embedded functionality for network connection, such as an automobile, tractor, or a smart thermostat or other Internet-of-Things (JOT) device. These are just examples, and many other types of devices are possible.

A user of the client computing device 104 may be, for example, an employee of an enterprise working remotely, such as from a home office. As another example, a user of the client computing device 104 may be, for example, an employee of an enterprise who accesses the enterprise resources 108 from the field, such as a field salesperson or other field employee. The enterprise resources 108 may be, for example, enterprise programs such as a customer relationship management system from Salesforce.com, Inc. or an enterprise file system provided by the Office365 system from Microsoft, Inc. These are just examples, and there are many other programs, systems, etc. that the enterprise resources 108 may comprise.

Referring to the FIG. 1 example system 100, the VPN client 102 may make a VPN request 110, to the VPN host 106, for a user U. That is, the VPN request 110 is for the user U, of the client computing device 104, to establish a VPN tunnel between the VPN client 102 and the VPN host 106. When the VPN tunnel is established between the VPN client 102 and the VPN host 106, the client computing device 104 may securely access the enterprise resources 108. The VPN request 110 is shown in FIG. 1 as logically originating at the VPN client 102 and being provided directly to the VPN host 106. As a practical matter, in the FIG. 1 example, the VPN request 110 may be provided via a local network 112 to which the client computing device 104 is connected, and then via the Internet 114, as the VPN request 110 proceeds to the VPN host.

The local network 112 may be, for example, a home or other facility wireless or wired network that includes a router/access point connected to a broadband connection out of the home or other facility. In another example, the local network 112 is an embedded network in an automobile or other vehicle, via which various systems in the vehicle communicate with each other. Local resources 116 may be connected to the local network 112. Such local resources 116 may include, for example, a wireless printer connected to a home or other facility wireless network. In other examples, the local resources 116 may include computing devices such as a Voice Over Internet Protocol (VoIP) device or a security system. In yet other examples, the local resources 116 may include temperature or other sensors connected to the local network 112. These are just examples, and many other types of local resources 116 are possible.

There are other (non-local) resources 118 shown in the FIG. 1 system 100 as being logically connected to the Internet 114. These other resources 118 may include, for example, web sites, computing devices or other devices that may or may not be secured, but are not connected to the local network 112 and are not secured as resources of an enterprise to which access is via a VPN tunnel with the enterprise. That is, the other resources 118 are distinguished from the enterprise resources 108 in the manner in which communication with them is secured (or not).

Referring still to FIG. 1 and referring back to the VPN request 110 for a user U, the VPN host 106 may respond to the VPN request 110 with an identity provider redirect message 120. For example, the identity provider redirect message 120, when received by the VPN client 102, may redirect the client computing device 104 to access an identity provider 122 for authentication of the user U. (An identity provider is sometimes referred to as an IdP.) The redirect to the identity provider 122 may be, for example, an HTTP request for the identity provider 122 to display a web page via which the identity provider 122 may display information to the client computing device 104 and receive information from the client computing device 104. The identity provider 122 may, for example, be an SSO service such as may be provided, for example, by Okta of San Francisco, Calif. An SSO service is an access control service usable with multiple related, yet independent, software systems of an enterprise or to which access is provided by the enterprise. With an SSO, a user logs in with a single ID and password to be authenticated to any of several related systems. For example, the SSO may utilize directory services of the enterprise, such as a Lightweight Directory Access Protocol (LDAP) service. The SSO may operate with a single authentication to provides access to multiple applications, by passing an authentication token to applications configured to receive it.

Referring still to FIG. 1, the VPN client 102 provides a login request 124 to the identity provider 122. The login request 124 may include, for example, a username corresponding to the user U and a password previously assigned to the user U. As discussed above, the identity provider 122 may be an SSO service. The password may thus be, for example, the same password the user U may use when located on-premise to the enterprise, for accessing the enterprise network and the enterprise resources 108. A user U may type the username and password, or the username and password may be provided automatically if, for example, they have been preconfigured into the VPN client 102. In other examples, other methods of proving identity are utilized, such as fingerprint or other biometric characteristics provided via one or more input interfaces to the client computing device 104.

The identity provider 122 processes the login request 124 to determine whether the user U is authorized to participate in a VPN tunnel, using the VPN client 102, with the VPN host 106. The identity provider 122 also interoperates with a policy manager 126 to obtain 128 a VPN policy according to which the VPN tunnel is to operate. The policy manager 126 may, for example, be provided as part of a directory service such as LDAP. For example, the directory service may hold, for enterprise users in a directory, one or more policies to be applied to the user when establishing a VPN tunnel for the user. The directory service may also hold, for the one or more users in the directory, one or more policies to be applied to the user for other software applications to which the user may establish access, either remotely or from on the premises of the enterprise. The identity provider 122 may provide 130 to the VPN client 102, an authorization for the user U to participate in a VPN tunnel between the VPN client 102 and the VPN host 106, along with an indication of the one or more policies the identity provider 122 obtained 128 from the policy manager 126.

The one or more policies whose indication is provided from the identity provider 122 to the VPN client 102 include at least a client portion and a host portion. The client portion is a portion of a policy according to which the VPN client 102 is to operate for the VPN tunnel. The host portion is a portion of the policy according to which the VPN host 106 is to operate for the VPN tunnel. For example, the client portion may include or be a split-tunneling policy. The split-tunneling policy may control which, if any, local resources 116 and other resources 118 the client computing device 104 is allowed to access during the VPN tunnel.

More generally, a VPN client policy may determine how traffic is to be handled by the client. For example, the client policy may comprise an ordered list of client policy rules, where each rule includes a match clause and an action clause. In an example, the match clause describes a condition on the traffic under which the client policy is to be applied. For example, conditions supported may include:

Originating apps (Apps installed on user devices where the traffic is generated).
Destination IP address.
Destination Ports.
Protocols.
Destination service names (fully-qualified domain names, or FQDNs).

Each condition may be stored an array of elements, for example, with elements of the array being processed with an OR operator. Different conditions may then be processed with an AND operator, e.g.: (Source APP 1 OR Source App2) AND (Destination IP address 1 or Destination IP address 2).

The action clause may describe how the VPN client is to operate with the matching traffic. Actions supported may include, in one example:

Direct: bypassing the tunnel and breakout to the Internet.
Labeling: adding a specific label to the traffic before injecting into the tunnel.
VPN/Interface selection: which means sending the traffic to a specific VPN head-end and/or through a specific interface.
Drop: dropping the traffic.

Referring still to FIG. 1, having been provided 130 the authorization and VPN policy from the identity provider 122, the VPN client 102 provides to the VPN host 106 an authorization message 132 that includes an indication of the VPN host policy corresponding to the host portion that the VPN host is provided 130 from the identity provider 122.

It can be seen that, in the FIG. 1 example system 100, a VPN client policy such as a split-tunneling policy may be provided to the VPN client 102 from the identity provider 122. Furthermore, the VPN client 102, having received the VPN host policy from the identity provider 122 as part of the authorization transaction between the VPN client 102 and the identity provider 122, may provide the VPN host policy to the VPN host 106 such that the VPN host 106 can receive the VPN host policy without additional interactions, such as with the policy manager 126 or other policy service. This primes the VPN host 106 with a VPN host policy appropriate to a particular user, at the initial stages of tunnel establishment. Thus, for example, the VPN host 106 may eliminate or minimize interaction with back-end policy services to obtain both a host-end and a client-end policy (such as a split-tunneling policy). This may reduce the complexity of the VPN host 106 functionality while increasing the overall messaging efficiency of the VPN tunnel establishment process.

Figure 2:
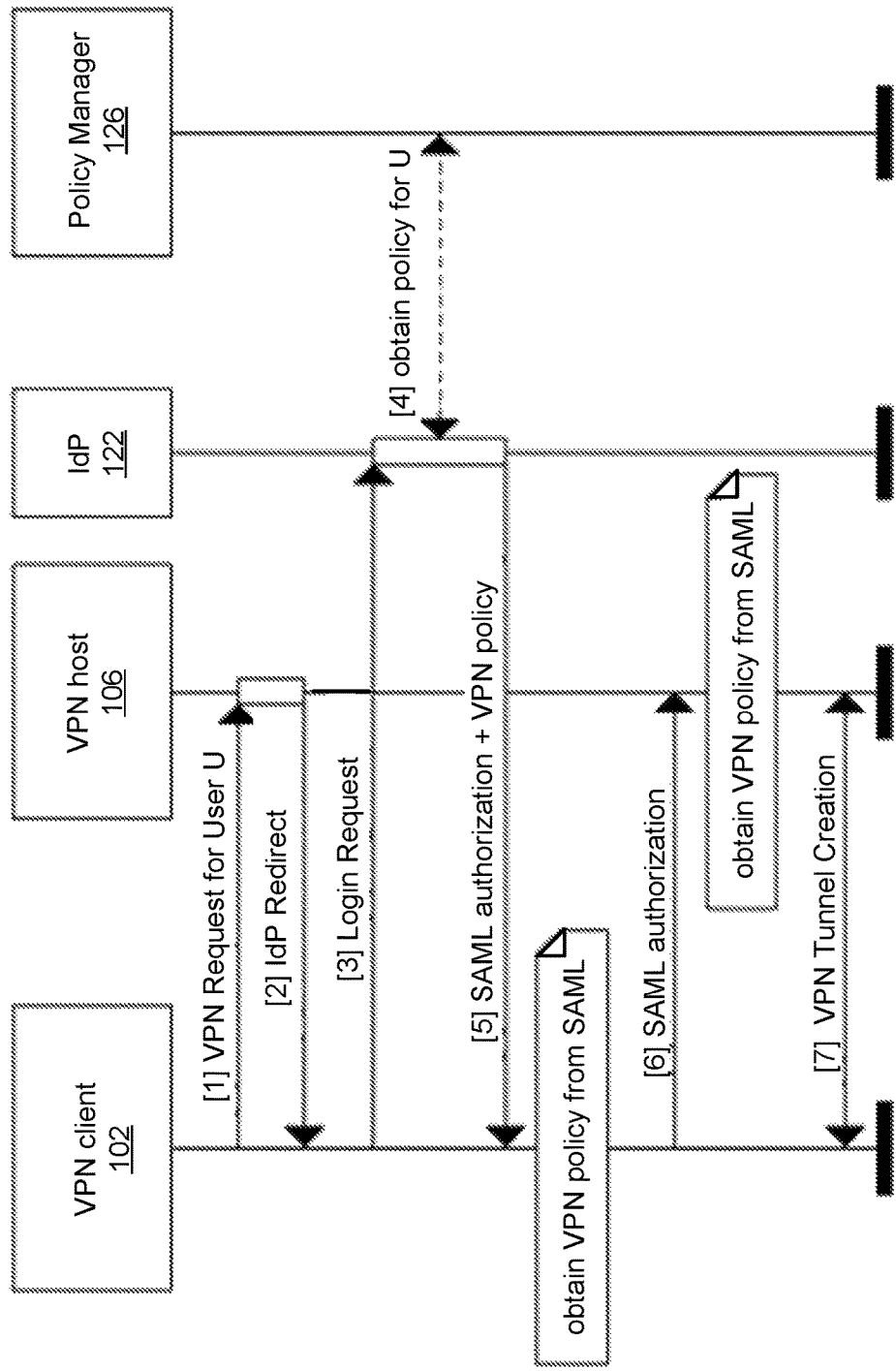
FIG. 2 is a diagram that illustrates a sequence of messages that components of the FIG. 1 system (or a similar system) may communicate in establishing a VPN tunnel.

FIG. 2 is a diagram that illustrates a sequence 200 of messages that components of the FIG. 1 system 100 (or a similar system) may communicate in establishing a VPN tunnel. At [1], the VPN client 102 sends a request to the VPN host 106 to establish a VPN tunnel for a user U. At [2], the VPN host 106 causes an IdP redirect message to be sent to the VPN client 102. At [3], the VPN client 102 sends a login request to the IdP 122 which may be, for example, an SSO service. At [4], the IdP 122 obtains a VPN policy for the user U from the policy manager 126. The VPN policy obtained for the user U from the policy manager 126 includes both a client-side policy according to which the VPN client 102 is to operate a VPN tunnel for user U and a host-side policy according to which the VPN host 106 is to operate the VPN tunnel for user U. This may mean, for example, that the client-side policy comprises policies to be enforced by the VPN client 102 during operation of the VPN tunnel for the user U, and the host-side policy comprises policies to be enforced by the VPN host 106 during operation of the VPN tunnel for the user U. Optionally, between [3] and [5], there may be a dialogue between the IdP 122 and the user U during which the user U proves her identity.

At [5], the IdP 122 provides an authorization, using a message formatted according to the Security Assertion Markup Language (SAML) protocol. As discussed below, the message may also include an authorization for the user U to establish a VPN tunnel. SAML is an open standard for exchanging authentication and authorization data between parties, in particular, between an identity provider and a service provider. SAML is an XML-based markup language for security assertions (statements that service providers use to make access-control decisions). SAML also includes a set of XML-based protocol messages, a set of protocol message bindings and a set of profiles. While the FIG. 2 example uses a SAML-formatted message at [5], messages formatted in other manners may be used at [5].

In one example, to carry the client policy (which may include the enterprise split-tunnel application routing policy) between the IdP 122 and the VPN client 102 and the VPN host 106, SAML response messages are extended. To support providing the appropriate policy to both the VPN client 102 and the VPN host 106, in one example, an XML name space for SAML responses is utilized. The XML name space defines a list of attributes to be enforced by both the VPN client 102 and the VPN host 106. In an example, this XML name space may carry attributes as follows:

client-app-list list-name
    (iOS app-id [ios-bundle-identifier [ios-unique-identifier]] |
    android <android parameters> |

```
            Windows <windows parameters> |
            MacOS (macos-processname [macos-responsible-processname]) |
            [pid] | (app-id [bundle-identifier [unique-identifier]] |
                ...)
networks network-name (ethernet | wifi | cellular [3G|4G|5G|5G-ent])
[beacon beacon] [cert cert-thumb]
fqdn-list list-name [*.]fqdn
    client-policy policy-name
        sequence number
            match
                client-app-list list-name
                    destination-data-prefix-list list-name
                destination-ip prefix/length
                destination-port number
                protocol number
                source-port number
                fqdn-list list-name
            action
                disposition (direct | tag tag [site (fqdn | ip-address)] | default [site
(fqdn | ip-address)] | drop) { interface network-name [prio priority] }*
                dscp number
```

In the example, policies crafted according to this XML name space describe how to route flows associated with certain applications, either identified by application signing key, or by FQDN. These definitions are combined with a list of dispositions for matching applications and/or IP parameters. The disposition table defines the split-tunnel application routing functions for offloading traffic directly to a local network interface (i.e., zero-trust networking), tagged traffic towards a VPN host possibly with a certain IP address (such as a Software-Defined Wide Area Network, or SD-WAN, or cloud-based security), or to follow a specific default network path. Additionally, the example policy includes rules for delivering packets across WiFi, cellular or Ethernet networks.

Referring still to FIG. 2, the VPN client 102 processes the SAML message provided at [5] to obtain at least the client-side VPN policy for the user U. At [6], the VPN client 102 provides a message to the VPN host 106 that includes the SAML authorization that the IdP 122 provides to the VPN client 102 at [5]. The message the VPN client 102 provides at [6] also includes the host-side VPN policy for the user U. The message the VPN host 106 provides to the VPN client 102 at [6] may be the same message the IdP 122 provides to the VPN client 102 at [5]. The VPN host 106 obtains the host-side VPN policy from the message provided to the VPN host 106 by the VPN client 102, at [6]. At [7], the VPN client 102 and the VPN host 106 interoperate to establish a VPN tunnel for the user U.

The VPN tunnel established at [7] operates according to the VPN policy provided to the VPN client 102 by the IdP 122. As discussed above, the VPN policy provided to the VPN client 102 by the IdP 122 may include both the client-side VPN policy and the host-side VPN policy. The VPN client 102 obtains the client-side policy and provides the host-side policy to the VPN host 106. Communicating the VPN policy in this way reduces the complexity of the VPN host 106 functionality, since the VPN host policy is provided to the VPN host 106 in a message the VPN host 106 is receiving anyway (for authorization of the user U), while increasing the overall messaging efficiency of the VPN tunnel establishment process.

Referring back to message [5] of the FIG. 2 message sequence 200, the message provided at [5] may also include a "lifetime" parameter for the VPN policy. When the lifetime of the VPN policy is close to expiring, the VPN host 106 may cause the VPN client 102 to be redirected to the IdP 122 to obtain a new lease on the policy. As a result of using the lifetime parameter, if the VPN posture and/or enterprise changes are to be enforced, both the VPN client 102 and the VPN host 106 may be automatically updated with the new policy as part of obtaining the new lease.

Furthermore, the VPN policy provided in the message at [5] may be signed by the IdP 122, such as using an asymmetric cryptology methodology like a public key methodology. Other cryptology methodologies are used in other examples.

Figure 3:
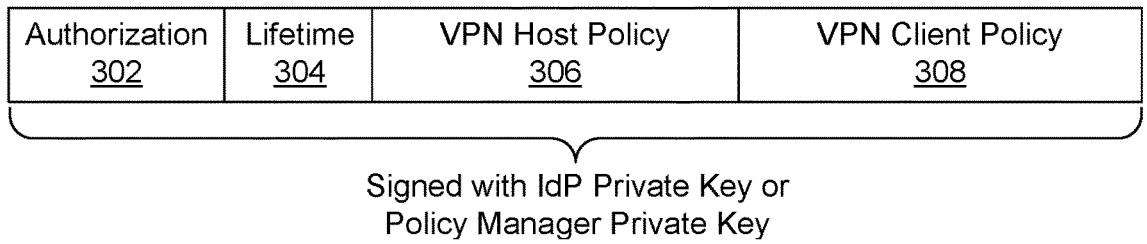
FIG. 3 illustrates an example SAML message, and the entire SAML message is encrypted/signed with a private key of an identity provider.

FIG. 3 illustrates an example SAML message 300 that includes an authorization portion 302, a lifetime portion 304, a VPN host policy portion 306 and a VPN client policy portion 308. The entire example SAML message 300 is signed with a private key of the IdP 122 or with a private key of the policy manager 126. As discussed above, SAML-formatting is an example, and other formatting may be utilized by the IdP 122 for a message including these portions. Because the example SAML message 300 is signed with a private key of the IdP 122 or of the policy manager 126, the VPN client 102 and the VPN host 106 may verify the authenticity of the example SAML message 300 using the public key of the IdP 122 or using the public key of the policy manager 126, as the case may be. One or both of the VPN host policy portion 306 and the VPN client policy portion 308 may be included "by reference," with the VPN host policy portion 306 holding a pointer or other indication to where data of a VPN host policy is actually stored and/or with the VPN client policy portion 308 holding a pointer or other indication to where data of a VPN client policy is actually stored. Thus, for example, the VPN client 102 and the VPN host 106 may obtain the policy from, for example, the IdP 122 using the pointer or other indication stored in the SAML message 300.

Figure 4:
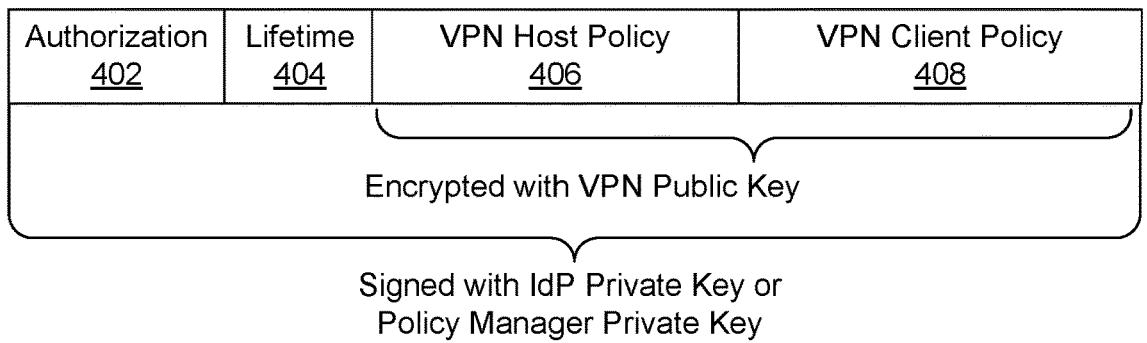
FIG. 4 illustrates an example SAML message, and entire SAML message is encrypted/signed with a VPN public key.

FIG. 4 illustrates an example SAML message 400 that includes an authorization portion 402, a lifetime portion 404, a VPN host policy portion 406 and a VPN client policy portion 408. Similar to the discussion above relative to the FIG. 3 example SAML message 300, one or both of the VPN host policy portion 406 and the VPN client policy portion 408 may be included "by reference," with the VPN host policy portion 406 holding a pointer or other indication to where data of a VPN host policy is actually stored and/or with the VPN client policy portion 408 holding a pointer or other indication to where data of a VPN client policy is actually stored. Referring still to FIG. 4, the entire example SAML message 400 (or at least the part of the SAML message 400 including the VPN host policy portion 406 and the VPN client policy portion 408) may be encrypted with a VPN public key. This provides confidentiality of the encrypted portions, as the VPN private key is utilized to decrypt the signed portions. The VPN private key, in accordance with this example, may be distributed to the VPN client 102 and to the VPN host 106. As shown in FIG. 4, the entire example SAML message 400 may be signed with the private key of the IdP 122 or with the private key of the policy manager 126.

Figure 5:
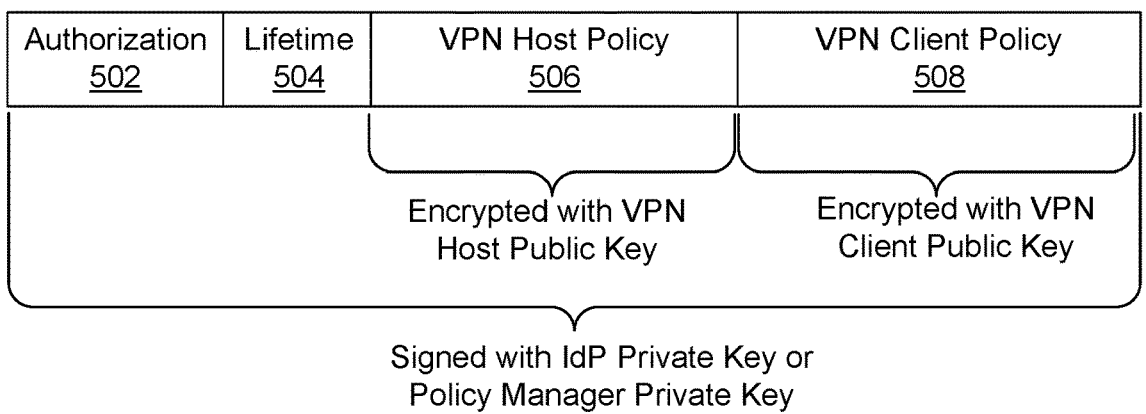
FIG. 5 illustrates an example SAML message with the VPN host policy portion and the VPN client policy portion encrypted/signed independently from each other, each with its own public key.

In another example, illustrated in FIG. 5, an example SAML message 500 includes an authorization portion 502, a lifetime portion 504, a VPN host policy portion 506 and a VPN client policy portion 508. The entire example SAML message 500, including an authorization portion 502, a lifetime portion 504, a VPN host policy portion 506 and a VPN client policy portion 508. Similar to the discussion above relative to the FIG. 3 SAML message 300 and the FIG. 4 SAML message 400, one or both of the VPN host policy portion 506 and the VPN client policy portion 508 may be included "by reference," with the VPN host policy portion 506 holding a pointer or other indication to where data of a VPN host policy is actually stored and/or with the VPN client policy portion 508 holding a pointer or other indication to where data of a VPN client policy is actually stored. Referring still to FIG. 5, the VPN host policy portion 506 and the VPN client policy portion 508 of the example SAML message 500 are encrypted independently from each other, each part with its own public key. The VPN host 106, knowing its own private key, may confidentially obtain the VPN host policy portion 506. And the VPN client 102, knowing its own private key, may confidentially obtain the VPN client policy portion 508. In an example, the private key of the VPN host 106 and the private key of the VPN client 102 are not shared between the VPN host 106 and the VPN client 102, providing an additional level of security. As shown in FIG. 5, the entire example SAML message 500 may be signed with the private key of the IdP 122 or with the private key of the policy manager 126.

Figure 6:
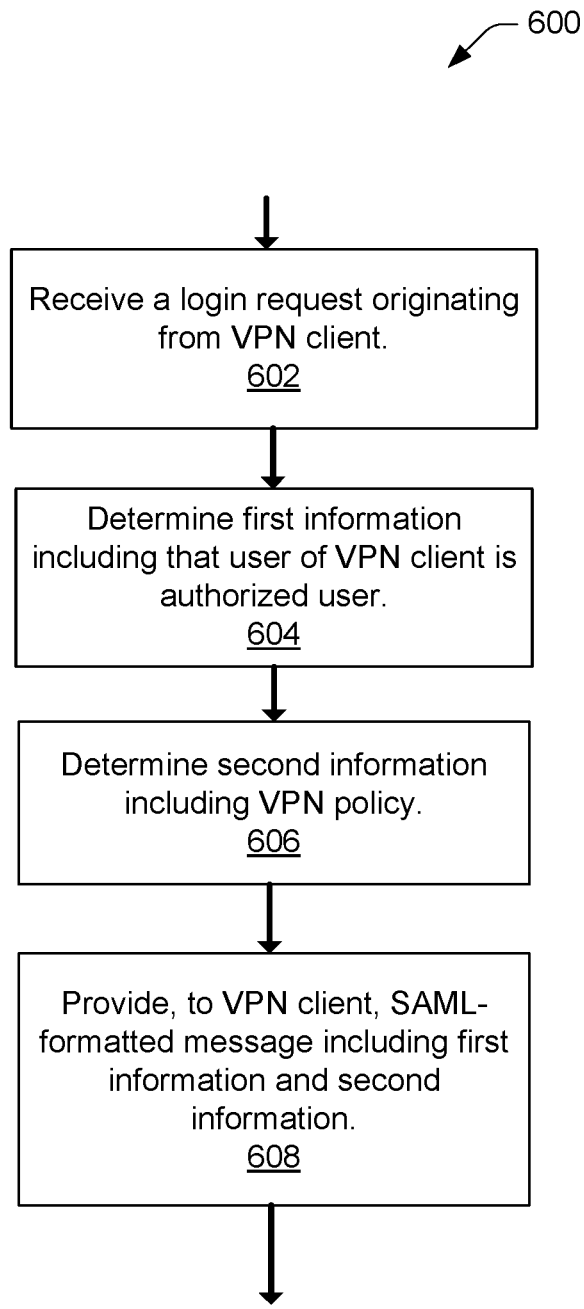
FIG. 6 is a flowchart illustrating an example process carried out by an identity provider in establishing a VPN tunnel between a VPN client and a VPN host.

FIG. 6 is a flowchart illustrating an example process 600 carried out by an identity provider (such as the identity provider 122) in establishing a VPN tunnel between a VPN client and a VPN host (such as the VPN client 102 and the VPN host 106). At 602, the identity provider receives a login request originating from a VPN client. For example, the login request may have resulted from a user of the VPN client requesting a VPN tunnel from a VPN host, and the VPN host redirecting to the VPN client to the identity provider. Being redirected to the identity provider, the VPN client may then originate the login request to the identity provider. The login request may include, for example, a user identification and a password.

At 604, the identity provider determines first information indicating that the user of the VPN client is an authorized user. The identity provider may determine the user is an authorized user by, for example, referring to an authentication service such as provided by an LDAP or other type of directory service. The directory service may, based on being provided the user identification of the user and password, determine whether the user is an authorized user. Being an authorized user may mean, for example, that the user is authorized to use the VPN client to communicate over a VPN tunnel established for the user between the VPN client and a VPN host.

At 606, the identity provider determines second information including a VPN policy. The identity provider may determine the second information by, for example, referring to a policy manager such as provided by an LDAP or other type of directory service. The VPN policy may include a VPN client policy to be utilized during the VPN tunnel by the VPN client and a VPN host policy to be utilized during the VPN tunnel by the VPN host.

At 608, the identity provider provides, to the VPN client, a response that includes the first information (indication that user is authorized) and the second information (VPN policy). In the FIG. 6 example process, the response includes the first information and the second information in a single message, such as a single SAML-formatted message.

Figure 7:
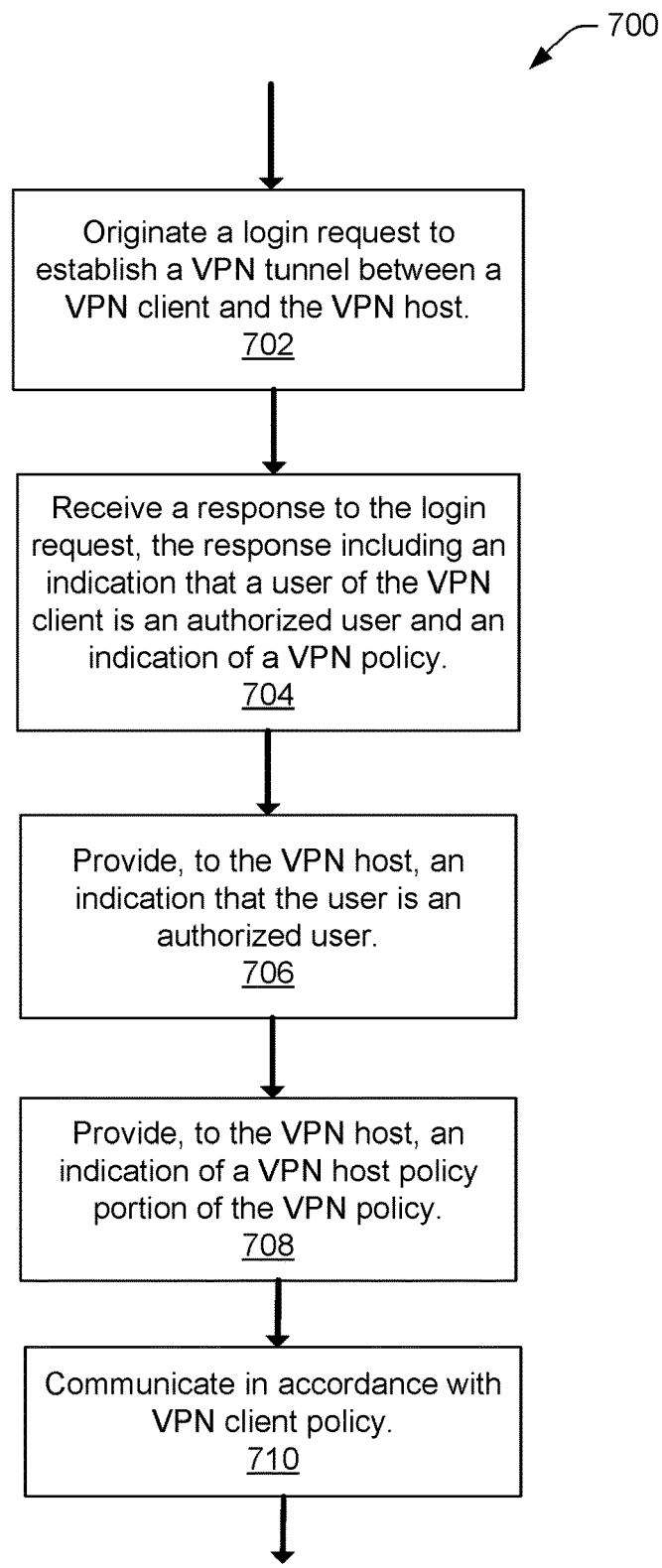
FIG. 7 is a flowchart illustrating an example process carried out by a VPN client in establishing a VPN tunnel between the VPN client and a VPN host.

FIG. 7 is a flowchart illustrating an example process 700 carried out by a VPN client in establishing a VPN tunnel between the VPN client and a VPN host (such as the VPN client 102 and the VPN host 106). At 702, the VPN client originates a login request to establish a VPN tunnel between the VPN client and a VPN host. The login request may be initiated, for example, by a user interacting with a user interface of an identity provider service such as an SSO, to which the VPN client was redirected after making a VPN request to the VPN host.

At 704, the VPN client receives a response to the login request. The response may include, for example, an indication that the user of the VPN client is an authorized user. The response may also include an indication of a VPN policy for the VPN tunnel that is to be established for the user between the VPN client and the VPN host. The VPN policy may include a VPN client policy to be utilized during the VPN tunnel by the VPN client and a VPN host policy to be utilized during the VPN tunnel by the VPN host. The response may include the authorization and the VPN policy in a single message, such as a SAML-formatted message. At 706, the VPN client provides, to the VPN host, an indication that the user is an authorized user. Furthermore, at 708, the VPN client provides, to the VPN host, an indication of a VPN host policy portion of the VPN policy. The indication provided at 706 and the indication provided at 708 may be provided together, in a single message. The single message may be SAML-formatted message.

At 710, the VPN client communicates in accordance with the VPN client policy. For example, the VPN client policy may include a split-tunneling policy, and the VPN client may apply the split-tunneling policy to communications from a client computing device on which the VPN client is executing.

Figure 8:
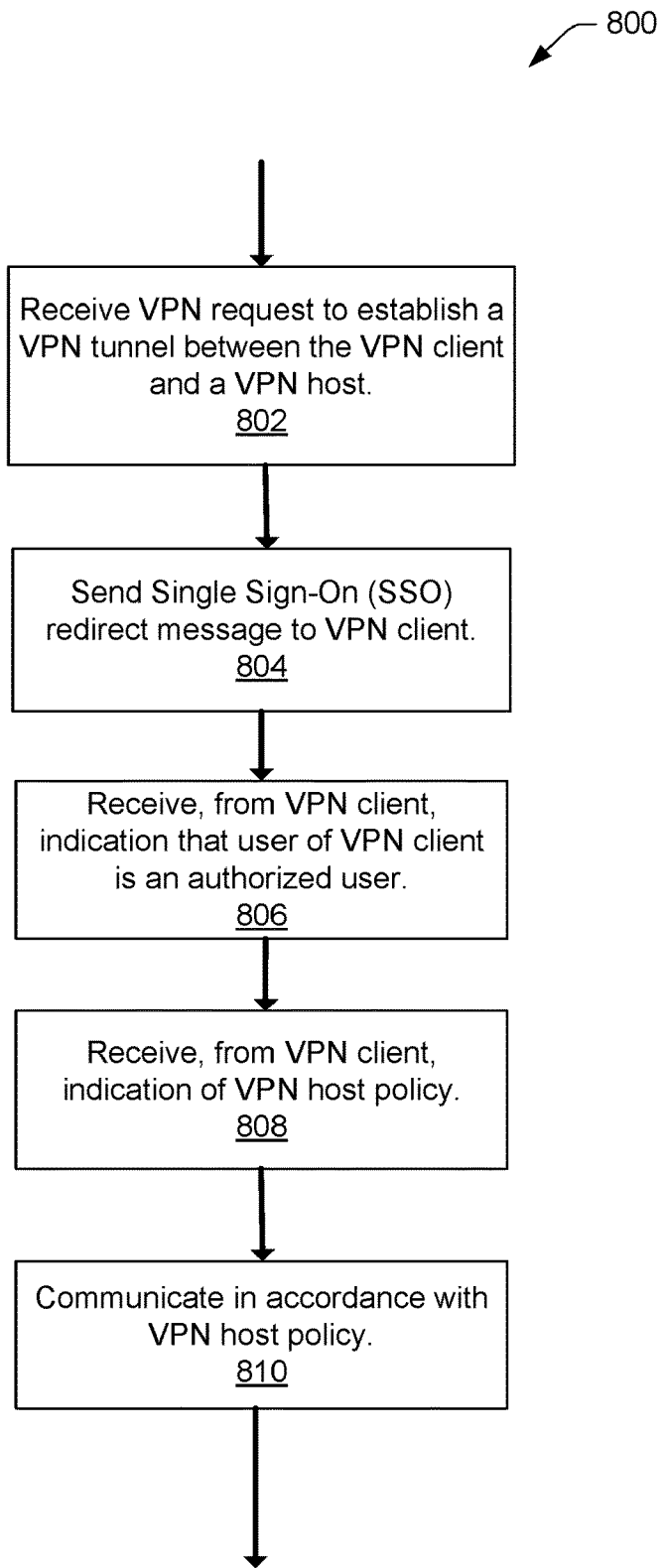
FIG. 8 is a flowchart illustrating an example process carried out by a VPN host in establishing a VPN tunnel between the VPN host and a VPN client.

FIG. 8 is a flowchart illustrating an example process 800 carried out by a VPN host in establishing a VPN tunnel between the VPN host and a VPN client (such as the VPN client 102 and the VPN host 106). At 802, the VPN host receives a request from a user to establish a VPN tunnel between a VPN client and the VPN host. At 804, the VPN host sends an SSO redirect message to the requesting VPN client. As is discussed relative to FIG. 7, for example, the VPN client may interact with an identity provider service to obtain an indication that the user is an authorized user, as well as to obtain an indication of a VPN policy. The indication of the VPN policy may include, for example, an indication of a VPN host policy and an indication of a VPN client policy.

At 806, the VPN host receives from the VPN client an indication that the user is an authorized user. Also, at 808, the VPN host receives from the VPN client an indication of the VPN host policy. In some examples, the VPN host receives, in a single message, both the indication that the user is an authorized user and the indication of the host policy. The single message may be, for example, a SAML-formatted message. At 810, the VPN host communicates in accordance with the VPN host policy.

Figure 9:
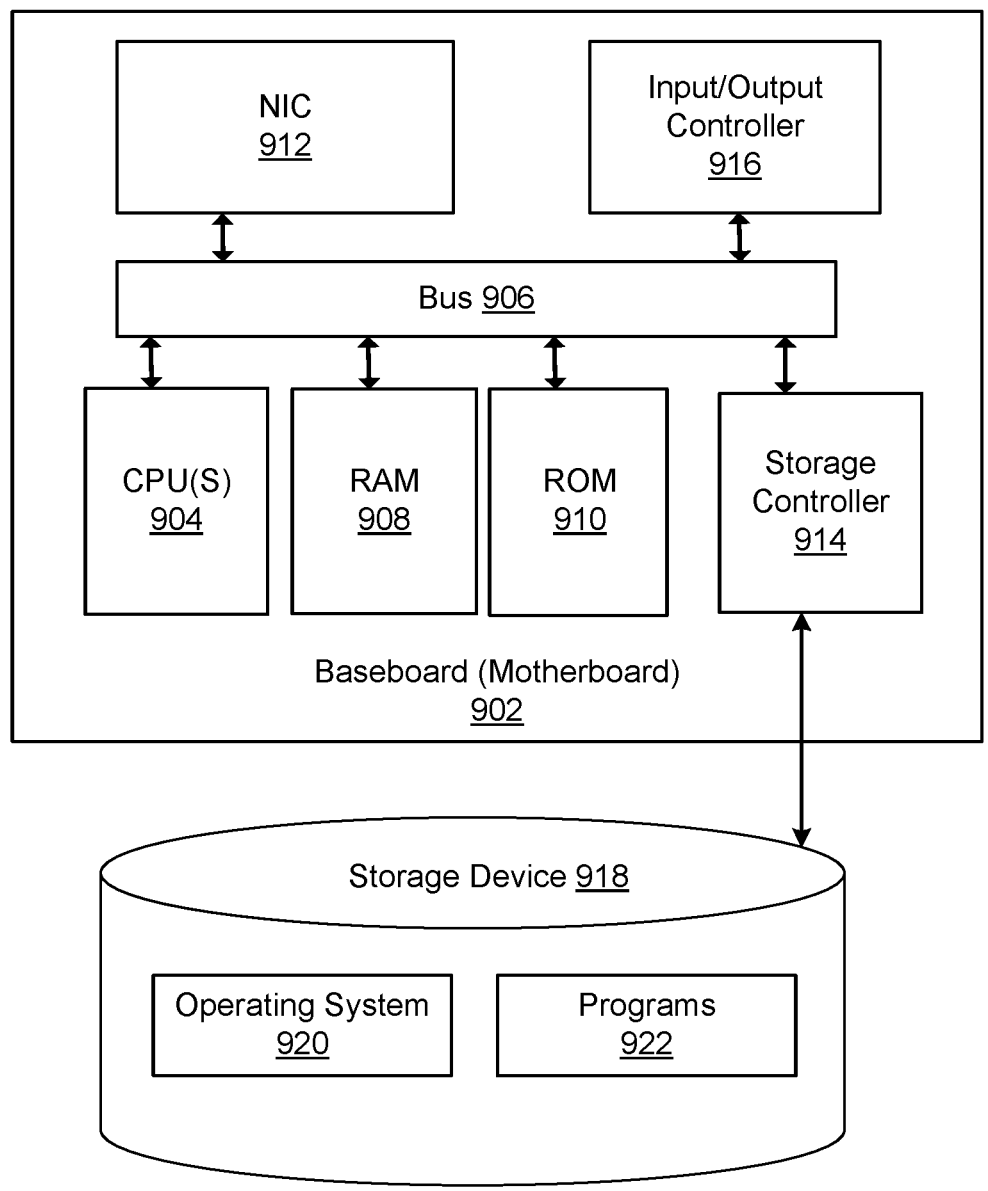
FIG. 9 illustrates an example computer architecture for a computer capable of executing program components for implementing the functionality described herein.

FIG. 9 illustrates an example computer architecture for a computer 900 capable of executing program components for implementing the functionality described above. The computer architecture shown in FIG. 9 illustrates an architecture of a server computer, workstation, desktop computer, laptop, tablet, network appliance, e-reader, smartphone, network switch, or other computing device, and can be utilized to execute any of the software components presented herein. The computer 900 may, in some examples, correspond to a network infrastructure device discussed herein.

The computer 900 includes a baseboard 902, or "motherboard," which may be a printed circuit board to which a multitude of components or devices can be connected by way of a system bus or other electrical communication paths. In one illustrative configuration, one or more central processing units ("CPUs") 904 operate in conjunction with a bus 906. The CPUs 904 can be, for example, standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The bus 906 provides an interface between the CPUs 904 and the remainder of the components and devices on the baseboard 902. The bus 906 can provide an interface to a RAM 908, used as the main memory in the computer 900. The bus 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein. As illustrated in FIG. 9, the ROM 910 or NVRAM can also store data usable by the computer 900 to communicate over a VPN tunnel, such as a VPN host policy and/or a VPN client policy. For example, if the computer 900 is executing a VPN client, the ROM 910 or NVRAM may store a VPN policy (that includes a VPN host policy and a VPN client policy) that the computer received from an identity provider. In other examples, this data may be stored elsewhere, such as in RAM 908.

The computer 900 can operate in a networked environment using logical connections to remote computing devices and computer systems through a network. For example, the bus 906 can include functionality for providing network connectivity through a Network Interface Controller (NIC) 912, such as a gigabit Ethernet adapter. The NIC 912 can connect the computer 900 to other computing devices over a network. It should be appreciated that multiple NICs 912 can be present in the computer 900, connecting the computer to other types of networks and remote computer systems. In some instances, the NICs 912 may include at least one ingress port and/or at least one egress port. An input/output controller 916 may be provided for other types of input/output.

The computer 900 can be connected to a storage device 918 that provides non-volatile storage for the computer. The storage device 918 can store an operating system 920, programs 922, and data, for example. The storage device 918 can be connected to the computer 900 through a storage controller 914 connected to the bus 906. The storage device 918 can include one or more physical storage units. The storage controller 914 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 can store data on the storage device 918 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 918 is characterized as primary or secondary storage, and the like. For example, the computer 900 can store information to the storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage device 918 by detecting the physical states or characteristics of one or more particular locations within the physical storage units.

In addition to the storage device 918 described above, the computer 900 can have access to other computer-readable storage media to store and retrieve information, such as program modules, data structures, or other data, including data to generate and/or process attestation information. It should be appreciated by those skilled in the art that computer-readable storage media is any available media that provides for the non-transitory storage of data and that can be accessed by the computer 900.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A method for an identity provider (IdP) service to interoperate with a Virtual Private Network (VPN) client, comprising:
by the IdP service, receiving a login request originating from the VPN client to establish a VPN tunnel between the VPN client and a VPN host, the login request indicating a user of the VPN client; and
by the IdP service, providing a response to the login request, the response including at least both:
first information including an indication that the user of the VPN client is an authorized user; and
second information including an indication of a VPN policy for the VPN tunnel, the VPN policy including a VPN client policy to be utilized during the VPN tunnel by the VPN client and a VPN host policy to be utilized during the VPN tunnel by the VPN host, wherein:
the response is a single message that is formatted according to a Security Assertion Markup Language (SAML) protocol;
the VPN host policy is included in a host policy portion of the single message; and
the VPN client policy is included in a client policy portion of the single message.

2. The method of claim 1, wherein:
the VPN client policy comprises at least a split tunneling policy.

3. The method of claim 1, further comprising:
by the IdP service, providing an indication of the user to a policy manager service; and
determining the indication of the VPN policy based on data provided by the policy manager service corresponding to the user.

4. The method of claim 1, wherein:
the host policy portion is signed in accordance with a key associated with the VPN host; and
the client policy portion is signed in accordance with a key associated with the VPN client.

5. The method of claim 1, wherein:
the first information is included in an authorization portion of the single message, the authorization portion signed in accordance with a key associated with the IdP service.

6. A method for a Virtual Private Network (VPN) client to form a VPN tunnel with a VPN host, comprising:
by the VPN client, originating a login request to establish the VPN tunnel between the VPN client and the VPN host, the login request indicating a user of the VPN client; and
by the VPN client, receiving a response to the login request, the response including at least both:
first information including an indication that the user of the VPN client is an authorized user; and
second information including an indication of a VPN policy for the VPN tunnel, the VPN policy including a VPN client policy to be utilized during the VPN tunnel by the VPN client and a VPN host policy to be utilized during the VPN tunnel by the VPN host, wherein:
the response is a single message that is formatted according to a Security Assertion Markup Language (SAML) protocol;
the VPN host policy is included in a host policy portion of the single message; and
the VPN client policy is included in a client policy portion of the single message; and
by the VPN client, providing at least an indication of the VPN host policy to the VPN host.

7. The method of claim 6, further comprising:
configuring the VPN client in accordance with at least the VPN client policy.

8. The method of claim 6, further comprising:
by the VPN client, communicating in accordance with at least the VPN client policy.

9. The method of claim 6, wherein:
the VPN host policy and the VPN client policy are encrypted in accordance with a public key associated with both the VPN host and the VPN client.

10. The method of claim 6, wherein:
the host policy portion is encrypted with a public key associated with the VPN host; and
the client policy portion is encrypted with a public key associated with the VPN client.

11. The method of claim 6, wherein:
the VPN client policy comprises at least a split tunneling policy.

12. The method of claim 6, further comprising:
receiving a single sign-on (SSO) redirect message that includes at least an IdP service as an indicated destination for the login request.

13. A method for a Virtual Private Network (VPN) host to form a VPN tunnel with a VPN client, comprising:
receiving by the VPN host, originating from the VPN client, first information including at least an indication of a VPN host policy to be utilized during the VPN tunnel by a VPN host, wherein:
the first information is received via a single message formatted according to a Security Assertion Markup Language (SAML);
the VPN host policy is included in a host policy portion of the single message; and
by the VPN host, establishing the VPN tunnel with the VPN client, including processing the VPN host policy.

14. The method of claim 13, wherein:
processing the VPN host policy includes configuring the VPN host in accordance with at least the VPN host policy.

15. The method of claim 13, further comprising:
by the VPN host, communicating in accordance with the VPN host policy.

16. The method of claim 13, further comprising:
receiving by the VPN host, second information originating from the VPN client, an indication that a user of the VPN client is an authorized user.

17. The method of claim 13, further comprising:
by the VPN host, receiving a login request originating from the VPN client; and
providing to the VPN client a single sign-on (SSO) redirect message that includes at least an Identity Provider (IdP) service as an indicated destination for the login request.

* * * * *